United States Patent [19]

Bosquain et al.

[11] Patent Number: 4,541,851
[45] Date of Patent: Sep. 17, 1985

[54] REACTOR AND APPARATUS FOR PURIFYING BY ADSORPTION

[75] Inventors: Maurice Bosquain; Maurice Grenier; Léon Hay, all of Paris; Paul Lapeyre, Bry-sur-Marne; Jean-Yves Lehman, Maisons Alfort; Pierre Petit, Chatenay-Malabry; Pierre Sauty, Versailles, all of France

[73] Assignee: L'Air Liquide, Societe Anonyme pour l'Etude et l'Exploitation des Procedes Georges Claude, Paris, France

[21] Appl. No.: 581,677

[22] Filed: Feb. 21, 1984

[30] Foreign Application Priority Data

Feb. 28, 1983 [FR] France ................. 83 03250

[51] Int. Cl.[4] ............................................. B01D 53/04
[52] U.S. Cl. ........................................ 55/208; 55/316; 55/387
[58] Field of Search ............... 55/208, 316, 319, 387, 55/389, 475

[56] References Cited

U.S. PATENT DOCUMENTS

| 985,966 | 3/1911 | Arnold | 55/316 |
|---|---|---|---|
| 1,802,941 | 4/1931 | Drager | 55/387 X |
| 2,517,525 | 8/1950 | Cummings | . |
| 3,217,471 | 11/1965 | Silverman | 55/387 X |
| 3,240,567 | 3/1966 | Caparreli et al. | 55/387 X |
| 3,264,803 | 8/1966 | Read | 55/208 |
| 3,434,599 | 3/1969 | Wischmeyer et al. | 55/316 X |
| 3,598,539 | 8/1971 | Pizzato | 55/389 X |
| 3,620,685 | 11/1971 | Rogers | . |
| 3,727,384 | 4/1973 | Feldman | 55/316 X |
| 3,965,695 | 6/1976 | Rush et al. | 55/208 X |
| 4,276,265 | 6/1981 | Gillespie | . |
| 4,364,753 | 12/1982 | Wagner | 55/179 |
| 4,388,086 | 6/1983 | Bauer et al. | 55/389 X |

FOREIGN PATENT DOCUMENTS

| 2545218 | 4/1977 | Fed. Rep. of Germany | . |
|---|---|---|---|
| 827705 | 5/1938 | France | 55/316 |
| 105721 | 8/1981 | Japan | 55/390 |
| 1225751 | 3/1971 | United Kingdom | 55/316 |
| 1449119 | 9/1976 | United Kingdom | 55/316 |
| 2003743 | 3/1979 | United Kingdom | 55/387 |

Primary Examiner—Robert Spitzer
Attorney, Agent, or Firm—Young & Thompson

[57] ABSTRACT

The case 2 of the container 1 having a vertical axis X-X contains two adsorbent beds 3,4 in the form of sleeves retained by three cylindrical grates 5, 6, 7. The intermediate grate 6 is axially rigid and radially flexible while the innermost and outermost grates 5,7 are axially flexible and radially rigid. This enables the container and the adsorbent beds to support without damage the successive heating and cooling stages in the course of the adsorbent regeneration stages. Application to the purification of large amounts of air intended to be distilled.

23 Claims, 7 Drawing Figures

REACTOR AND APPARATUS FOR PURIFYING BY ADSORPTION

The present invention relates to a reactor and in particular a container for purifying a fluid by adsorption having at least one annular bed of particles, of the type comprising a case which defines a first region and a second region adapted to be connected respectively to a source and to an outlet of the fluid to be treated, these two regions being separated by at least one space adapted to contain an annular bed of particles of active material, the or each space having the shape of a sleeve with vertical generatrices defined by two grates.

The invention is in particular applicable to the drying-decarbonation of air before it enters the cold part of apparatus for separating the constituents of the air by distillation.

The technique of the purification of air by adsorption presents considerable advantages over the competing technique of purification by refrigeration deposit in reversible exchangers; it provides the possibility of delivering up to 70% of the air flow in the form of pure gases, 30% of dry and decarbonated nitrogen produced being sufficient for the regeneration of the adsorbents; it adds an additional safety in utilization when it has a molecular sieve bed whose property is to arrest in addition to the $CO_2$, other impurities present in traces in the air which are dangerous owing to the effect of accumulation, such as acetylene; the reliability of this technique is moreover excellent and it is easy to carry out; it limits the shaking, the noises and the losses of gas related to the inversions which are much less frequent than in the case of the technique employing reversible exchangers.

On the other hand, the purification by adsorption implies high outlay as concerns both investment and operating costs, in particular when it concerns the purification of large amounts of fluids. As concerns the investment, an important item is the adsorbent itself, which, for example, may represent about 30% of the total cost of the purifying apparatus in respect of an apparatus producing about 1000 tons of oxygen per day.

Catalytic reactors are moreover known in which the treated fluid travels radially through one or more annular beds of catalyst particles. However, when the reactions to be effected imply frequent variations in the temperature of the fluid flowing in the apparatus, as is the case in particular of treatments by adsorption, the known arrangements present high risks of rupture and deterioration of the particles owing to differential thermal expansions-contractions.

An object of the invention is to extend the technology of the annular beds to such reactions and in particular, to achieve, in a reliable and repeated manner and at reduced cost, a purification by adsorption of large quantities of fluid, in particular air of the atmosphere, while maintaining a good distribution of the treated fluids and fluid circulation velocities compatible with the mechanical properties of the adsorbent particles employed.

The invention consequently provides a reactor, and in particular a container for purifying by adsorption, of the aforementioned type, wherein at least one of the grates is rigid in the axial direction, each grate is free to expand thermally in the axial direction independently of the other grates, and the two grates which are respectively the innermost grate and the outermost grate are rigid in the radial direction.

Preferably, all the grates are rigidly interconnected at each end and a single grate is rigid in the axial direction, while the other grate or grates are flexible in the axial direction. In this embodiment, the grates flexible in the axial direction are capable of elastically deforming so as to compensate for their own expansion and that of the axially rigid grate.

The invention also provides an apparatus for purifying by adsorption, which comprises at least one purifying container such as that defined hereinbefore, the outer region of which is connected to the source of fluid to be purified. The resulting direction of flow may appear paradoxical in the case of the purification of the air of the atmosphere when there are used two adsorbent beds one of which is constituted by alumina while the other is constituted by a molecular sieve. Indeed, the air must first of all travel through the alumina whose particles have a density and a particle size greater than those of the molecular sieve and which consequently allows a rate of circulation before attrition which is higher than the molecular sieve. Further, it is known that the pressure drop per unit length travelled through, which has the disadvantageous result of increasing the compression energy required, increases with increase in velocity and decrease in the particle size.

These two considerations appear logically to lead to placing the alumina radially inside the molecular sieve. However, with the reverse arrangement, this may be compensated for by the fact that, during the hot regeneration stage, the hot fluid gives up the major part, and even the whole, of its heat to the two adsorbent beds before reaching the exterior grate. Consequently, the latter is heated to a less extent and therefore subjected to less deformations, which has advantageous consequences as concerns the mechanical performance of the grates and the adsorbent beds, as will be explained hereinafter. Further, the case of the container does not need any particular thermal insulation, since in this place losses of heat are no longer to be feared.

A few embodiments of the invention will now be described with reference to the accompanying drawings, in which.

Figure 1:
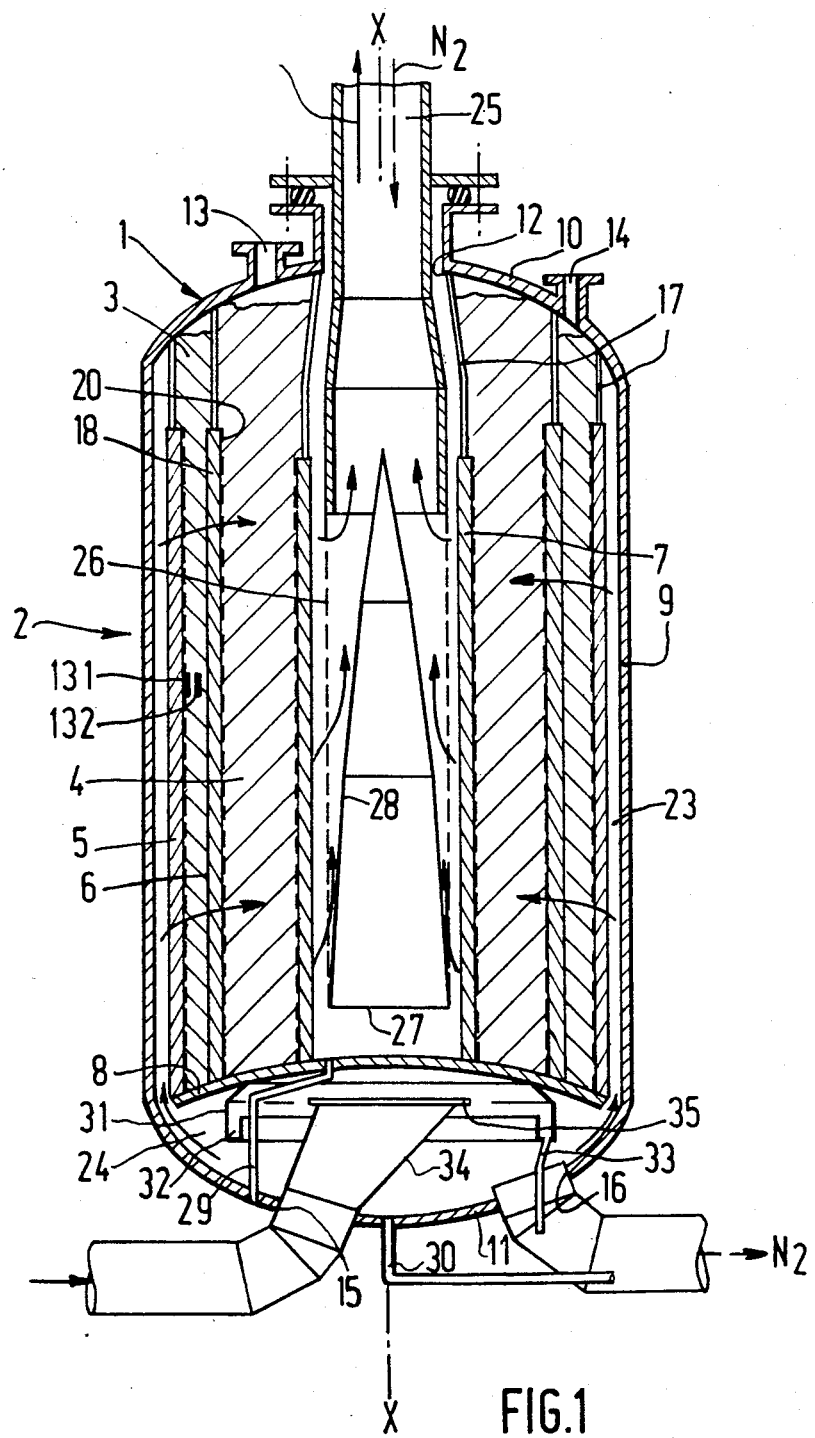
FIG. 1 is a diagrammatic longitudinal sectional view of a first embodiment of a container for purifying by adsorption according to the invention.

The container for purifying by adsorption 1 shown in FIG. 1 is generally a figure of revolution about a vertical axis X—X and is adapted to effect the drying-decarbonation of the air intended to be treated in the cold part of an apparatus for effecting a distillation of this air. This container 1 mainly comprises an outer case 2 which contains two beds of adsorbent 3 and 4 retained by three grates 5, 6 and 7 and by a rigid suspended bottom 8.

The case 2, which is fixed to a frame (not shown) by suitable means, is formed by a cylindrical sleeve 9 having a circular cross-sectional shape and completed at each end by a dome 10, 11 having a semi-elliptical longitudinal section. The upper dome 10 has a central opening 12, an inner ring arrangement of openings 13 and an outer ring arrangement of openings 14, and the lower dome 11 has an opening 15 connected to a source of air to be purified (not shown) and an opening 16 for discharging to the surrounding air the regeneration fluid which is, for example, dry and decarbonated nitrogen from the cold part of the distillation apparatus.

The three grates 5–7 are cylindrical and have an axis X—X. Each is suspended from the upper dome 10 by a respective guard ring 17 of solid sheet metal. The central ring 17 is connected to the periphery of the central opening 12, the intermediate ring 17 to a circumference of the dome 10 located between the ring arrangements of openings 13 and 14, and the outer ring 17 to a circumference of the dome 10 located between the ring arrangement of opening 14 and the connection of this dome to the sleeve 9. The openings 13 and 14 are used for the gravity filling and the emptying by aspiration of the two adsorbent beds 3 and 4 respectively in the annular space between the grates 6 and 7 and in that between the grates 5 and 6.

At its lower end, each grate is fixed to the upper surface of the bottom 8. The latter is solid and upwardly crowned and its outside diameter is substantially equal to that of the outer grate 5.

The grates 5 to 7 each have a framework 18. A fine grating 20 is fixed to the inner side of the frameworks of the grates 5 and 6 and to the outer side of that of the grate 7 so as to retain the adsorbent particles.

Figure 2:
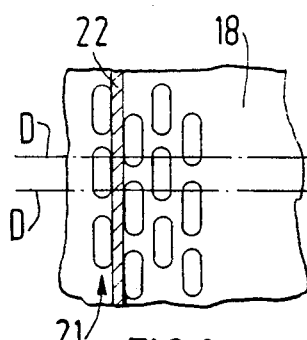
FIGS. 2 and 3 show two details of this container.
Figure 3:
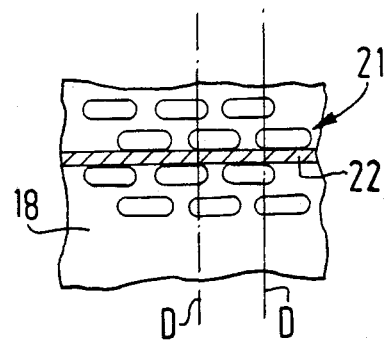

As can be seen in FIGS. 2 and 3, the three frameworks 18 are made from perforated metal sheets having the same geometry of perforations. Each of these sheets has equidistant rows 21 of oblong appertures. These appertures are offset by a semi-length from one row to the next so that any straight line D perpendicular to the rows 21 intersects a multitude of appertures, while between the rows 21 there are solid bands 22, one of which has been shown by the crosshatching in FIGS. 2 and 3.

Thus, the considered perforated sheet has very different mechanical properties depending on the direction in which it is stressed: parallel to the rows 21, it has merely the elasticity particular to the metal owing to the solid bands 22. On the other hand, in the direction perpendicular to these rows 21, it has a considerably greater elastic flexibility.

In the framework 18 of the intermediate grate 6, the rows 21 are disposed vertically as shown in FIG. 2. Thus, the grate 6 may be considered to be substantially rigid axially and elastically flexible in the circumferential (or radial) direction. In the framework 18 of the two end grates 5 and 7, on the other hand, the rows 21 are disposed horizontally on circles, as shown in FIG. 3. These two grates 5 and 7 are consequently substantially rigid circumferentially (or radially) and elastically flexible in the axial direction. It must be understood that the adjective "rigid" is intended to mean that the sole possible deformations in the considered direction (axial or circumferential) are due to the elasticity of the metal itself and to the expansions-contractions of thermal origin. It will be understood that each fine grating 20 has a flexibility at least equal to that of the framework carrying it, at least in the corresponding direction. The gratings 20 may be in particular of the deployed metal type. Note that, in order to be capable of withstanding the exterior pressure to which it is subjected, the inner grate 7 may have a thicker framework 18 and may also be provided with inner reinforcing rings (not shown).

It can be seen that the inner space of the case 2 contains:

between the sleeve 9 and the outer grate 5, a narrow annular region 23 which is extended under the bottom 8 by a chamber 24 between this bottom and the lower dome 11;

between the outer grate 5 and the intermediate grate 6, an annular region extending from the upper dome 10 to the bottom 8; this region is filled through the openings 14 with the adsorbent bed 3 which is formed by particles of alumina which are preferably balls having a diameter of 2 to 5 mm;

between the intermediate grate 6 and the inner grate 7, an annular region extending also from the upper dome 10 to the bottom 8; this region is filled through the openings 13 with the adsorbent bed 4 which is formed by molecular sieve particles, for example particles of molecular sieve of type X having pores of 10 Å of balls having a diameter of 1.6 to 2.5 mm.

The container 1 is completed by a pipe 25 which is coaxially inserted with a sealed joint in the opening 12 of the upper dome 10 and held fast by a flanged fastening. This pipe carries a tubular filter 26 of metal grating having a fine mesh, for example of the order of 40$\mu$, the base 27 of this filter being connected to the base of a non-perforated distribution element 28 of a roughly conical shape which extends throughout the height of the filter 26. Further, a dust-removing pipe 29 extends from the central zone of the bottom 8 and through the lower dome 11, and a water-removing pipe 30 leads from the lower point of this dome 11 and opens into the nitrogen outlet pipe connected to the opening 16.

Advantage is taken of the presence of the solid bottom 8 facing the air inlet opening 15 for constituting a liquid-water separator: fixed to the lower side of the bottom 8 is an annular skirt 31 which has a divergent conical shape followed by a cylindrical shape the end part of which is bent so as to constitute a collector through 32. Leading from the bottom of the latter are emptying tubes 33 which open into the nitrogen outlet pipe. The air is sent to the bottom 8 through a divergent pipe 34 whose end close to this bottom is provided with a horizontal outer flange 35.

All the pipes associated with the container 1 are of course provided with valves (not shown), whereby it is possible to carry out the operating cycle which will now be described.

PURIFYING STAGE

The opening 15 is put in communication with the source of air, for example with the delivery end at about 6 absolute bars of the air compressor of the distillation apparatus; the opening 16 is closed and the pipe 25 is put in communication with the air inlet end of the thermal exchange line of the cold part of the apparatus.

The compressed air impinges on the bottom 8. By the centrifugal effect, any droplets of water contained therein run in all directions on this bottom and then on the skirt 31; they accumulate in the trough 32 and are discharged through the tubes 33. Owing to the deep and narrow shape of the trough the air has no tendency to entrain the collected water again and the film of water created inside the pipe 34 is also sent to this trough owing to the flange 35.

The air from which the liquid water has been removed is then distributed in the chamber 24 from which it passes at low velocity into the outer annular region 23; the air then travels radially towards the axis XX through the bed of alumina 3 which adsorbs the water thereof, then the bed of molecular sieve 4 which adsorbs the $CO_2$ thereof. The small thickness of the beds 3 and 4 results in a low pressure drop when the air travels therethrough.

The dry and decarbonated air must then pass through the filter 26 which retains possible entrained dusts of adsorbent and then leaves the container 1 through the pipe 25. The element 28 ensures a gradual increase in the section of passage of the air from the base to the top of the filter 26, which corresponds to the gradual increase in the air flow. In this way there is obtained a uniform rising velocity of the air in the filter 26 which ensures a uniform distribution of the air along the height of the beds 3 and 4. The uniformity of this distribution presupposes a given profile of the element 28 in the shape of a paraboloid of revolution. However, in order to facilitate the production of this element, it may be constructed with sufficient approximation in the form of a plurality of superimposed truncated cones whose apex angle increases upwardly as shown in FIG. 1.

REGENERATION STAGE

The two beds of adsorbent are regenerated by isolating the opening 15 from the source of air by connecting the pipe 25 to the pipe of the low-pressure, dry and decarbonated, nitrogen (pressure of the order of 1 absolute bar) issuing from thermal exchange line of the distillation apparatus and by putting the opening 16 in communication with the surrounding atmosphere. Conventionally, these operations are preceded by an operation decompressing the container if the treated air is supplied at a distinctly higher pressure, as is the case in the present example. Consequently, the nitrogen enters the container 1 through the pipe 25, travels through the filter 26 in the outward direction, and possibly unclogs it, and then travels through the bed 4 and the bed 3 in succession, it being charged with $CO_2$ and water adsorbed during the preceding purifying stage. The nitrogen lastly passes through the outer region 23 and then into the chamber 24 and is discharged to the surrounding air through the opening 16.

During the first part of the regeneration, the nitrogen is heated before reaching the container 1. A heat front is progressively propagated from the inner grate 7 to the outer grate 5 and creates at each instant between the various points of the grates and of the adsorbent beds, large temperature gradients or differences. During the second part of the regeneration, the heating of the nitrogen is stopped so as to return the two beds 3 and 4 to their initial adsorption temperature. A cooling front creating a temperature gradient in the direction opposed to the preceding direction is then propagated from the inner grate 7 to the outer grate 5. The structure of the three grates described hereinbefore permits supporting in a reliable and repeated manner the expansions-contractions of thermal origin. There will be considered hereinunder first of all the expansions-contractions which occur in the axial direction and then those oriented circumferentially.

(1) Axial expansions-contractions: only the intermediate grate 6 is axially rigid. It therefore supports alone the weight of the bottom 8, of the three grates and of the two beds 3 and 4 and undergoes solely an elastic elongation resulting from this weight and the contractions and expansions due to the changes of temperature to which it is subjected. When this grate 6 expands or contracts thermally, it affects without difficulty the other two grates 5 and 7 so that all the corresponding points of the three grates located initially in a common horizontal plane are located after the considered expansion or contraction in another common horizontal plane. Further, when one of the other in two grates 5 or 7 is heated or cooled, its tendency to expand or contract is compensated for by its elasticity, its total length being imposed by that of the grate 6. Consequently, none of its points moves vertically.

Consequently, the cyclic temperature gradients nowhere produce relative sliding between the wall of a grate and those of the other two grates; therefore no vertical shearing occurs in the adsorbent beds and consequently no abrasion occurs in the particles constituting these beds.

(2) Circumferential expansions contractions: when, at the beginning of the regeneration, the heat front only concerns the inner grate 7, the latter expands radially, though to a small extent owing to its small diameter. Consequently it exerts a centrifugal force on the bed 4, the upper level of which cannot rise owing to the phenomenon known under the name "silo effect". As a result, the expansion of the grate 7 develops a pressure in the bed 4, but this pressure is transmitted to the bed 3 through the intermediate grate 6 owing to the great radial flexibility of the latter. The reduction in the volume of the inner bed 4 resulting from the expansion of the grate 7 is thus distributed throughout the two beds and this considerably reduces the stresses on the particles of the bed 4 and on the grate 7.

These stresses increase thereafter with increase in the heating and consequently the expansion of the adsorbent particles of the two beds and then they decrease if the heat front reaches the outer grate 5, owing to the large radial expansion of the latter and, in any case, at the beginning of the cooling stage, when the inner grate 7 and then the two adsorbent beds contract. In practice, the heating of the regeneration nitrogen is stopped when the heat front substantially reaches the bed 3.

When thereafter the cooling reaches the outer grate 5, this grate exerts, owing to its circumferential contraction, a large centripetal thrust on the outer bed 3 owing to the large diameter of this grate. As before, the silo effect prevents the upper level of the bed 3 from rising so that a pressure is developed in this bed. Again, the grate 6, which is radially flexible, transmits this pressure to the bed 4 and the reduction in the volume imposed on the outer bed 3 is distributed between the two beds and this considerably reduces the stresses on the particles of the bed 3 and on the grate 5.

Tests have shown that it was possible to effect the successive regenerations by maintaining the stresses to which the particles of the two beds 3 and 4 are repeatedly subjected to a sufficiently low level to avoid any destruction of the particles and to remain within the elastic deformation range of the latter, even during the most unfavourable period in the course of which, at the beginning of the regeneration, the inner grate 7 and a part of the adsorbents are subjected to the temperature of the heated regeneration gas while the outer grate (that of the larger diameter) is not yet subjected to this temperature. Under these conditions, in the course of the successive cycles, there is no gradually increasing settling of the two adsorbent beds when the volume allowed to them is maximum (grate 7 cold, grate 5 hot) and the risk of rupture of the grates is avoided.

In order to reduce still further the level of the stresses due to the thermal cycles, the heating of the nitrogen may be so controlled that the heat front never reaches the outer grate 5, by means of a temperature sensor 131 disposed in the bed 3 very close to this grate. One then proceeds by successive approximations, from one cycle to the next, by increasing the amount of heat supplied to the nitrogen until the heat front is detected at the sensor 131. This control is facilitated, and may even be easily carried out without the aid of a calculator, if there is also used a second temperature sensor 132 disposed in the bed 3 at a short radial distance away from the sensor 131 toward the axis X—X. The optimum heating value is obtained when, upon each regeneration, the heat front reaches the sensor 132 but not the sensor 131. Under these conditions, the grate 5 not only undergoes no expension-contraction of thermal origin but the case 2 is never heated and therefore may be constructed without any particular thermal insulation.

Figure 4:
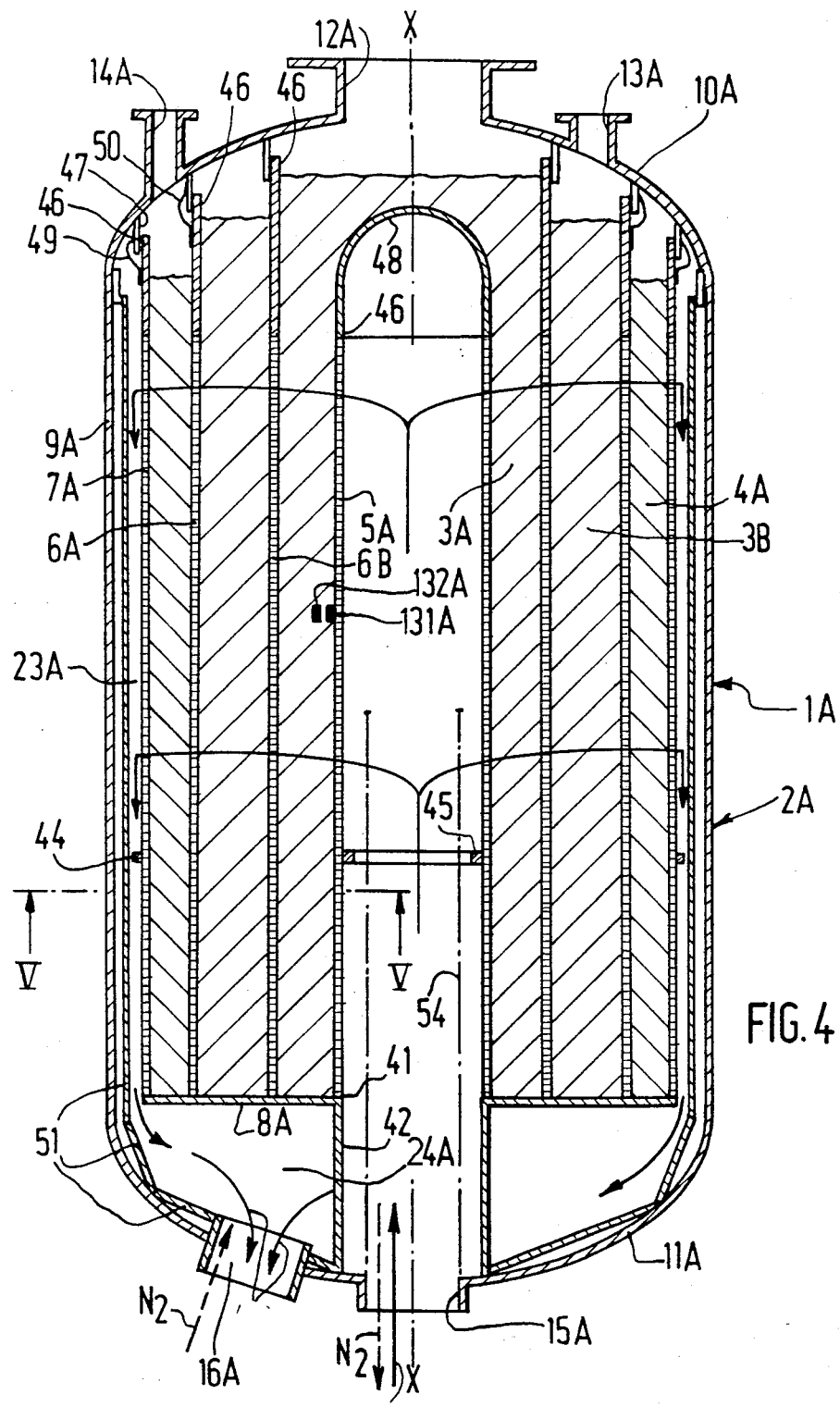
FIG. 4 is a view similar to FIG. 1 of a second embodiment of a container for purifying by adsorption according to the invention.

The purifying container 1A of FIG. 4 is also generally a figure of revolution about a vertical axis X—X. It comprises an outer case 2A of the same general shape as the case 2 of FIG. 1 formed by a cylindrical sleeve 9A, an upper dome 10A and a lower dome 11A.

The upper dome 10A is provided with a central opening 12A and two ring arrangements of filling openings 13A and 14A. The lower dome 11A has a central air inlet and nitrogen outlet opening 15A and a lateral nitrogen inlet and air outlet opening 16A.

A rigid solid bottom 8A is positioned in the lower part of the case 2A. This bottom has a central opening 141 whose periphery is fixed to the upper end of a rigid tube 42. The base of the latter is fixed around the central opening 15A of the lower dome 11A.

An inner grate 5A is fixed at its lower end to the bottom 8A, around the opening 41, and an outer grate 7A is fixed at its lower end to the periphery of the bottom 8A whose diameter is slightly less than that of the sleeve 9A. An intermediate cylindrical grate 6A is fixed at its base to the bottom 8A together with an additional intermediate grate 6B located between the grates 5A and 6A.

Each of the grates 5A, 6A, 6B, and 7A is formed by a metal sheet perforated with openings which are sufficiently small to arrest the adsorbent particles and have such arrangements and shape as to avoid imparting to these grates a marked elastic flexibility in the vertical direction. This sheet has a generally cylindrical shape with an axis X—X and has longitudinal ribs 43 which are alternately inner and outer ribs and adjacent to each other (FIG. 5) and which impart to the sheet a corrugated appearance. The end grates 5A and 7A are provided respectively internally and externally with a series of horizontal stiffening rings 44, 45, a ring of each series having been shown in FIG. 4. Consequently, these end grates are rigid in both the circumferential and axial directions while the two intermediate grates 6A and 6B are axially rigid but elastically flexible in the circumferential direction. Further, all the grates are free at their upper end where they are provided with metal guard rings 46. The three outer rings 46 are externally and axially slidably guided by respective cylindrical guides 47 fixed to the dome 10A, one being located externally of the openings 14A, the second between openings 14A and the openings 13A, and the third between the latter and the central opening 12A. The central guard ring 46 terminates in an upper dome 48. The rings 46, the guides 47 and the dome 48 are unperforated.

The annular space between the grates 5A and 6B is filled through the opening 12A with a bed 3A of alumina of large particle size (balls having a diameter of 5 to 10 mm), which allows relatively high gas flow velocities. The adjacent annular space between the grates 6A and 6B is filled through the openings 13A with a bed 3B of alumina of smaller particle size (balls having a diameter of 2 to 5 mm), and the annular space between the grates 6A and 7A is filled through the openings 14A with a bed 4A of molecular sieve (molecular sieve of the X-type having pores of 10 Å with balls having a diameter of 1.6 to 2.5 mm), whose limit attrition velocity is less than that of the alumina of small particle size. These three beds are emptied by aspiration through the filling openings, as in the embodiment of FIG. 1.

As can be seen in FIG. 4, it is arranged that the level of the bed 3A have a height above the base of the central ring 46 which is at least equal to the radial thickness of this bed 3A; the level of the bed 3B is a little lower and located slightly below the guide 47 associated with the grate 6B. Likewise, the level of the bed 4A is again a little lower and located slightly below the guide 47 associated with the grate 6A. A flexible sealing ring 49 is fixed by its lower edge to the outer surface of the outer ring 46 and by its upper edge to the associated guide 47. Likewise, a flexible sealing ring 50 is fixed by its lower edge to the outer surface of the ring 46 associated with the grate 6A, a little above the bed 4A, and by its upper edge to the corresponding guide 47.

In this example, the direction of flow of the gases is reversed relative to FIG. 1.

In the purifying stage, the air is sent through the central opening 15A and through the tube 42 and travels radially outwardly through the three adsorbent beds, as indicated by the arrows in FIG. 4. The air is dehydrated in passing through the two alumina beds 3A and then 3B, and then is decarbonated in the molecular sieve 4A, its velocity gradually decreasing as it travels away from the central axis X—X. The purified air accumulates in the outer annular space 23A between the outer grate 7A and the sleeve 9A, passes into the lower chamber 24A, located under the bottom 8A, and leaves the container 1A through the opening 16A.

In the regeneration stage, the dry and decarbonated nitrogen enters the container 1A through the opening 16A, is distributed in the chamber 24A and then in the annular space 23A and then travels in the centripetal direction through the three adsorbent beds in succession, enters the central space and leaves the container through the tube 42 and the lower opening 15A. As in the example in FIG. 1, the grates can expand freely independently of each other in the axial direction, and the pressures produced by the differential expansions in the circumferential direction are transmitted to all of the three beds owing to the circumferential flexibility of the two intermediate grates 6A and 6B. Further, the ribs 43 have the advantage of increasing the section offered to the passage of the gases.

In the course of each stage of the cycle, the guard height of the central bed 3A and the presence of the flexible rings 49 and 50 guarantees the effective passage of the gas through the three adsorbent beds.

Note that, in this example, at the beginning of the regeneration, the nitrogen reaches the annular space 23A in the hot state. This requires the presence of a thermal insulation of the case 2A throughout the concerned part, for example by means of a thin layer of static air separated from the interior atmosphere of the container by thin sheets 51 which permit balancing the pressures.

Figure 5:
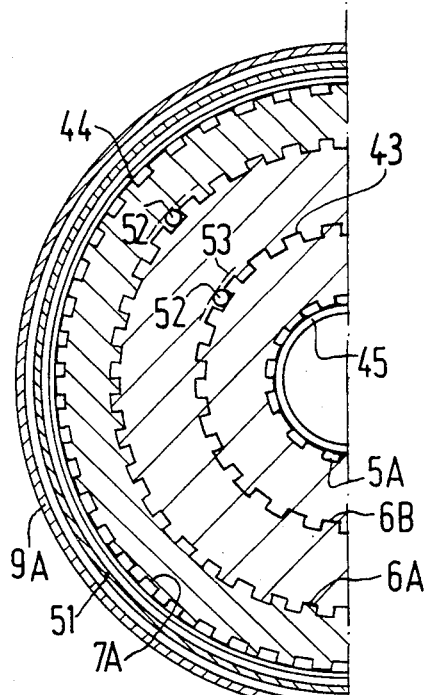
FIG. 5 is a semi-cross sectional view taken along line V—V of FIG. 4.

By way of a modification, the two intermediate grates 6A and 6B may have, at least in some corrugation valleys or bottoms defined by the ribs 43, heating elements 52 formed for example by heating cables, two of which have been shown in FIG. 5. Each element 52 is covered with a fine grating 53 fixed to the two adjacent ribs 43, which ensures that the adsorbent particles do not come into direct contact with this element 52. The grating 53 has of course the required circumferential flexibility.

This additional heating serves to reheat the regeneration nitrogen. The interest of this internal reheating with respect to a conventional external reheating is two-fold: on one hand, there is a gain as concerns the technology of the piping, valves, joints, etc. upstream of the container which are designed for a lower temperature, on the other hand, there is a gain as concerns the regeneration time since, owing to the local supply of heat, the transit time of the heat in the adsorbent bed is shorter.

For the purpose of minimizing the heating of the nitrogen required for the regeneration of the three adsorbent beds, the inner bed 3A may be supplied with temperature sensors 132A close to the inner grate 5A, which results in a control of the regeneration similar to that described hereinbefore with reference to FIG. 1.

Further, means may also be provided in the container 1A for improving the uniformity of the distribution of the air throughout the height of the grate 5A. These means may, for example, comprise an inlet tube 54, shown in dot-dash lines in FIG. 4, whose diameter is less than that of the grate 5A and which rises from the opening 15A to a level a little below the mid-height of this grate 5A. By way of a modification, an element such as the element 28 of FIG. 1 with its point lowermost, could also be employed.

It will be understood that perforated corrugated sheets may also be used in the arrangement of FIG. 1 so as to constitute grate frameworks having an elastic flexibility in either direction: radial flexibility with vertical corrugations, axial flexibility with circular or helical corrugations. The corrugations may in each case have various sections: square, trapezoidal, sinusoidal, etc.

Figure 6:
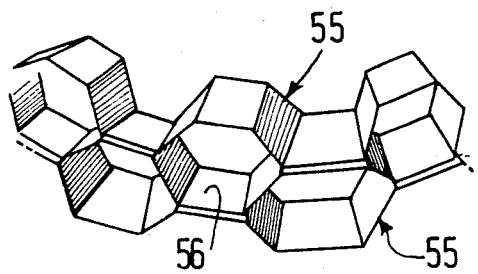
FIG. 6 is a partial perspective view of a modification.

Other modifications may also be envisaged for obtaining grates having uni-directional flexibility. For example, there is shown in FIG. 6 a part of a cylindrical framework of honeycomb construction formed by a stack of rings of corrugated sheets 55, the corrugations of which are trapezoidal. These corrugations are offset by a semi-pitch from one ring to the next and the horizontal confronting areas 56 are fixed to each other. The framework formed in this way is solely axially flexible but radially rigid.

Figure 7:
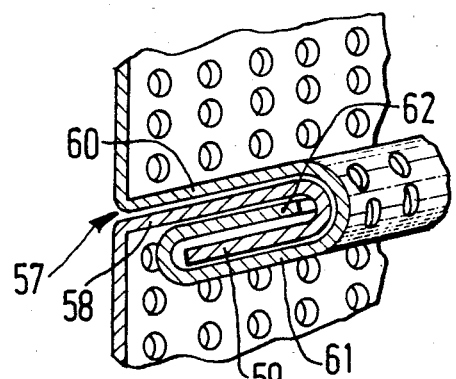
FIG. 7 is a partial sectional view of another modification.

In another modification illustrated in FIG. 7, applicable to each of the embodiments of FIGS. 1 and 4, each grate has a framework of a perforated metal sheet wound in a helix in the manner of a flexible pipe or hose. The coils are connected to each other by a clipping or hooking together 47 which has a certain axial elasticity. This hooked assembly may for example comprise, as shown, an inward fold 58, then an outward fold 59 for the upper edge portion of each coil and, for the lower edge portion of the coil located above, a triple fold which surrounds the preceding double fold and consists of an inward fold 60, an outward fold 61 and a final inward fold 62.

Further, the arrangements of FIGS. 1 and 4 may be combined, as concerns the general arrangement of the grates, in the following manner: as concerns the container having two beds of FIG. 1, the grates 5 and 7 are replaced by grates which are both axially radially rigid and provided at their upper end with joints similar to those of FIG. 4, which enable them to slide on respective guard rings 17.

The container 1 or 1A according to the invention permits the treatment of air intended for air separating apparatus of large capacity (up to 320,000 Nm$^3$/hr for example) with a moderate regeneration flow, of the order of 40% of the nitrogen produced and with a distinctly reduced investment cost. Note also that the high rate of filling of the inner space of the case 2 or 2A owing to the arrangement of the adsorbent beds in cylindrical rings, results in a low loss of gas at the inversions.

Further, the inventors have found that, with the horizontal flow direction, the limit velocities before attrition of the adsorbent particles are several times higher than those corresponding to an ascending vertical flow, so that they no longer necessarily constitute a limiting factor: the high velocities now technically possible are rather limited, moreover to values distinctly higher than those employed in conventional apparatus, by other considerations and in particular by those relating to pressure drops in the passage through the adsorbent beds and to problems of uniformity of distribution of the gases throughout the height of these beds.

It must be understood that the invention is applicable to other types of reactions in which a fluid of variable temperature is caused to pass through one or more annular beds of particles of active material and in particular catalysts.

We claim:

1. A reactor, in particular a container for purifying fluid by adsorption, comprising a case which has an axis and defines a first region and a second region respectively for connection to a source and to an outlet of a fluid to be treated, said first and second regions being separated by at least one space containing an annular bed of particles of active material, said at least one space being defined by two grates and having the shape of a sleeve having vertical generatrices, at least one of said grates being rigid in the axial direction, the grates being free to expand thermally in the axial direction independently of one another, and the two grates located respectively in an innermost position and an outermost position being rigid in the radial direction.

2. A reactor according to claim 1, having at least three said grates including at least one intermediate grate which is flexible in the radial direction.

3. A reactor according to claim 2, wherein all the grates have respective frameworks constructed from metal sheets which are perforated in an identical manner, each sheet having parallel rows of elongated openings, said elongated openings being offset from one row to the next row.

4. A reactor according to claim 2, wherein each grate having flexibility in one direction defines openings which overlap in said one direction.

5. A reactor according to claim 1, comprising at least two said spaces, wherein all the grates are rigidly interconnected at each end of the grates, and a single grate is rigid in the axial direction, while the other grates are flexible in the axial direction.

6. A reactor according to claim 5, wherein the grates are suspended from the case and a rigid suspended bottom interconnects said grates at bases of said grates.

7. A reactor according to claim 6, wherein said bottom is slightly upwardly crowned.

8. A reactor according to claim 5, wherein each grate having flexibility in one direction defines openings which overlap in said one direction.

9. A reactor according to claim 1, comprising a rigid bottom fixed to all of said grates at bases of said grates, said rigid bottom being connected to the case and said grates being free at upper ends thereof.

10. A reactor according to claim 9, comprising guiding partition walls connected to the case for respectively guiding said grates, said grate upper ends being slidable along said walls.

11. A reactor according to claim 1, wherein at least one said grate is flexible in a radial or axial direction and has a corrugated shape, the corrugations being oriented in a direction perpendicular to said radial or axial direction.

12. A reactor according to claim 11 wherein the corrugated grates carry heating elements disposed in some bottoms of the corrugations.

13. A reactor according to claim 1, wherein at least one said grate is flexible in the axial direction and has a framework which comprises a stack of corrugated rings which are offset from each other by a semi-pitch of the corrugation of the rings and fixed to each other by tops of the corrugations.

14. A reactor according to claim 1, wherein at least one said grate is flexible in the axial direction and has a framework which comprises a perforated metal sheet coiled helically into successive coils, axially flexible clipping means interconnecting said coils of perforated metal sheet.

15. A reactor according to claim 1, wherein said second region includes a filter.

16. A reactor according to claim 1, wherein the annular bed adjacent to said first region is provided with a temperature sensor close to the grate which defines said region.

17. A reactor according to claim 16, wherein the annular bed adjacent to said first region is provided with a second temperature sensor which is at a short radial distance from the first-mentioned temperature sensor.

18. A reactor according to claim 1, wherein a central region of said regions of the container is provided with a substantially conical element for distributing fluids passing through said region.

19. A reactor according to claim 1, wherein a fluid inlet and outlet tube extends into a central region of said regions of the container to roughly the mid-height of the innermost grate.

20. A reactor according to claim 1, comprising one said space, wherein both grates are rigidly interconnected at each end of the grates, and a single grate is rigid in the axial direction, while the other grate is flexible in the axial direction.

21. A reactor according to claim 20, wherein the grates are suspended from the case and a rigid suspended bottom interconnects said grates at bases of said grates.

22. An apparatus for purifying by adsorption, comprising a source of a fluid to be purified and at least one purifying container which comprises a case which has an axis and defines a first region and a second region, said first and second regions being separated by at least one space containing an annular bed of particles of adsorbent material, said at least one space being defined by two grates and having the shape of a sleeve having vertical generatrices, at least one of said grates being rigid in the axial direction, the grates being free to expand thermally in the axial direction independently of one another, and the two grates located respectively in an innermost position and an outermost position being rigid in the radial direction, an outer region of said regions of the container being connected to said source of fluid to be purified.

23. A purifying apparatus according to claim 22 for purifying a gas, comprising a bottom in said container, which bottom interconnects said grates and is combined with a baffle constituting a droplet separator, and means for supplying said gas to be purified to the container in confronting relation to said bottom.

* * * * *